United States Patent
Li et al.

(10) Patent No.: US 10,126,725 B2
(45) Date of Patent: Nov. 13, 2018

(54) ELASTIC RULE ENGINE FOR A SMART HOME

(71) Applicant: Samsung Electronics Co., Ltd, Suwon-si (KR)

(72) Inventors: Zhiyun Li, Mountain View, CA (US); Pei Zheng, Mountain View, CA (US); Qia Wang, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 15/064,525

(22) Filed: Mar. 8, 2016

(65) Prior Publication Data

US 2017/0261954 A1 Sep. 14, 2017

(51) Int. Cl.
| | |
|---|---|
| *G05B 19/04* | (2006.01) |
| *G05B 19/042* | (2006.01) |
| *G06N 5/02* | (2006.01) |
| *H04L 12/28* | (2006.01) |

(52) U.S. Cl.
CPC ........... *G05B 19/042* (2013.01); *G06N 5/025* (2013.01); *H04L 12/2816* (2013.01); *G05B 2219/2642* (2013.01)

(58) Field of Classification Search
CPC .......... G05B 19/042; G05B 2219/2642; G06N 5/025; H04L 12/2816
See application file for complete search history.

(56) References Cited

U.S. PATENT DOCUMENTS

| | | | |
|---|---|---|---|
| 9,396,599 B1* | 7/2016 | Malhotra | G07C 9/00174 |
| 9,712,549 B2* | 7/2017 | Almurayh | H04L 63/1425 |
| 2014/0108019 A1 | 4/2014 | Ehsani et al. | |
| 2014/0324192 A1* | 10/2014 | Baskaran | G05B 15/02 700/19 |
| 2015/0309484 A1* | 10/2015 | Lyman | G05B 13/0205 700/275 |
| 2017/0053210 A1* | 2/2017 | Duong | G06N 99/005 |

FOREIGN PATENT DOCUMENTS

| | | |
|---|---|---|
| CN | 101782768 A | 7/2010 |
| CN | 103592925 A | 2/2014 |

\* cited by examiner

*Primary Examiner* — Vanthu Nguyen

(57) ABSTRACT

An embodiment of this disclosure provides an apparatus including a communications unit and at least one processor. The communications unit is configured to communicate with a client device in the system. The at least one processor is coupled to the communications unit. The at least one processor configured to monitor a rule in the system. The rule controls the client device. The at least one processor is also configured to, responsive to the rule for the client device being triggered, determine whether an anomaly exists in the system. The at least one processor is also configured to, response to the anomaly existing, determine whether an override action is available for the anomaly. The at least one processor is also configured to, responsive to the override action being available, override the rule.

20 Claims, 5 Drawing Sheets

ELASTIC RULE ENGINE FOR A SMART HOME

TECHNICAL FIELD

This disclosure relates generally to home automation. More specifically, this disclosure relates to an elastic rule engine for a smart home.

BACKGROUND

Home automation is automation of the home, housework or household activity. Home automation may include centralized control of lighting, heating, ventilation, air conditioning, appliances, security locks of gates and doors, and other systems, to provide improved convenience, comfort, energy efficiency and security. Current smart home systems are designed for simple controlling or monitoring, for example, controlling light bulb from smartphone. Some systems are designed to be smarter by allowing user to create some straightforward rules, for example: turn off lights at 10 pm every day. In real-life scenarios, however, these types of rules don't usually provide the best experience, especially to facilitate a relaxing lifestyle at home.

SUMMARY

This disclosure provides an elastic rule engine for a smart home.

In a first embodiment, this disclosure provides an apparatus including a communications unit and at least one processor. The communications unit is configured to communicate with a client device in the system. The at least one processor is coupled to the communications unit. The at least one processor configured to monitor a rule in the system. The rule controls the client device. The at least one processor is also configured to, responsive to the rule for the client device being triggered, determine whether an anomaly exists in the system. The at least one processor is also configured to, response to the anomaly existing, determine whether an override action is available for the anomaly. The at least one processor is also configured to, responsive to the override action being available, override the rule.

In a second embodiment, this disclosure provides a method for managing a smart home system. The method includes monitoring a rule in the smart home system. The rule controls the client device. The method also includes, responsive to the rule for the client device being triggered, determining whether an anomaly exists in the system. The method also includes, response to the anomaly existing, determining whether an override action is available for the anomaly. The method also includes, responsive to the override action being available, overriding the rule.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

This disclosure describes an elastic rule engine for smart home. Smart home is usually controlled by rules configured by users. The smart home system monitors the conditions of the rules and triggers them when conditions are met. In many real-life scenarios, however, the rule sometimes has to be overridden to facilitate a more flexible lifestyle at home, i.e. an anomaly. The elastic rule engine for smart homes continuously collects a number of smart homes' rules and users' override actions together with anomaly contexts. A machine learning system learns from those crowd-sourced data and associates the most likely override actions with related anomalies. Then the elastic rule engine recommends the most likely override action when similar anomaly is detected in the future. For situations where the elastic rule engine cannot make a clear recommendation or doesn't have a learned override action, it will ask the appropriate user to take an override action and learn from the user's decision continuously.

Figure 1:
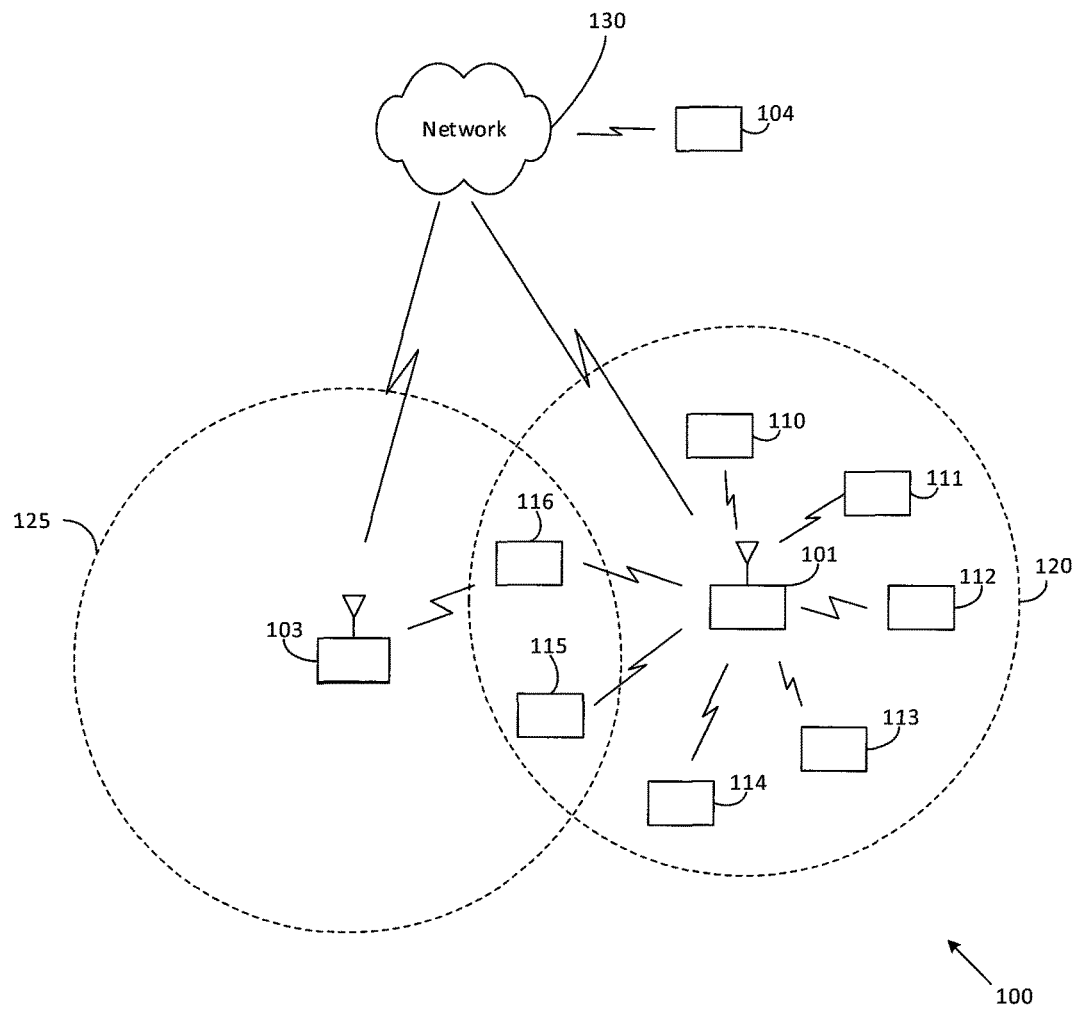
FIG. 1 illustrates an example network for managing smart homes according to this disclosure.

FIG. 1 illustrates an example wireless network 100 for managing smart homes according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an access point 101 and an eNodeB (eNB) 103. The access point 101 can be a wireless access point, such as, for example, a networking hardware device that allows wireless devices to connect to a wired network wirelessly using BLUETOOTH, Wi-Fi, near field communication, and the like. The access point 101 communicates with at least one network 130, such as the Internet, a proprietary Internet Protocol (IP) network, or other data network.

The access point 101 provides wireless broadband access to the network 130 for a first plurality of smart homes within a coverage area 120 of the access point 101. The first plurality of user equipments (UEs) includes a computing device 110, a light 111; a smoke detector 112; a motion sensor 113; a controllable power socket 114; and an appliance 115. Access point 101 also provides access to network 130 for user equipment (UE) 116, which may be a mobile device like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 116. In some embodiments, the eNBs may communicate with each other and with the UE 116 using 5G, LTE, LTE-A, WiMAX, WiFi, or other wireless communication techniques.

For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with access points and eNBs, such as the coverage areas 120 and 125, may have other shapes, including irregular shapes, depending upon the configuration of the access points and eNBs and variations in the radio environment associated with natural and man-made obstructions.

The devices of the system 100 are coupled to and communicate via a network 120. The network 120 may be the Internet or other wide-area network (WAN), a local-area network (LAN), or any other suitable network providing communication between computer systems. The network 130 can further connect to a server 104, such as an open cloud server.

A server 104 includes any suitable computing or processing device that can provide computing services for one or more client devices. Each server 104 could, for example, include one or more processing devices, one or more memories storing instructions and data, and one or more network interfaces facilitating communication over the network 130. While reference is made herein to a single server 104, it will be understood that the server 104 can be implemented as a network of servers providing data availability, security, and fail-safe redundancy. While reference is made herein to an open cloud server, it will be understood that in other embodiments any suitable smart home server system may be employed.

Although FIG. 1 illustrates one example of a wireless network 100, various changes may be made to FIG. 1. For example, the wireless network 100 could include any number of access points and any number of smart home devices in any suitable arrangement. Also, the access point 101 could communicate directly with any number of access points and provide those access points with wireless local area access to the network 130. Further, the access point 101 could provide access to other or additional external networks, such as external telephone networks or other types of data networks.

Figure 2:
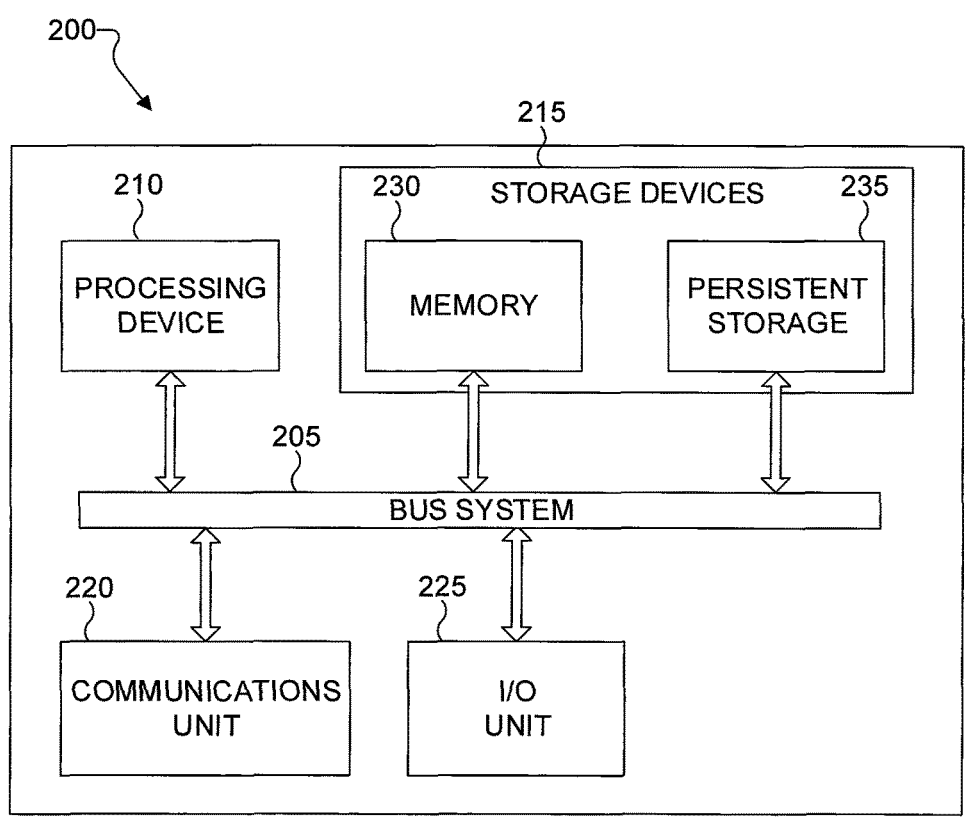
FIGS. 2 and 3 illustrate example electronic devices in a communication system according to various embodiments of the present disclosure.
Figure 3:
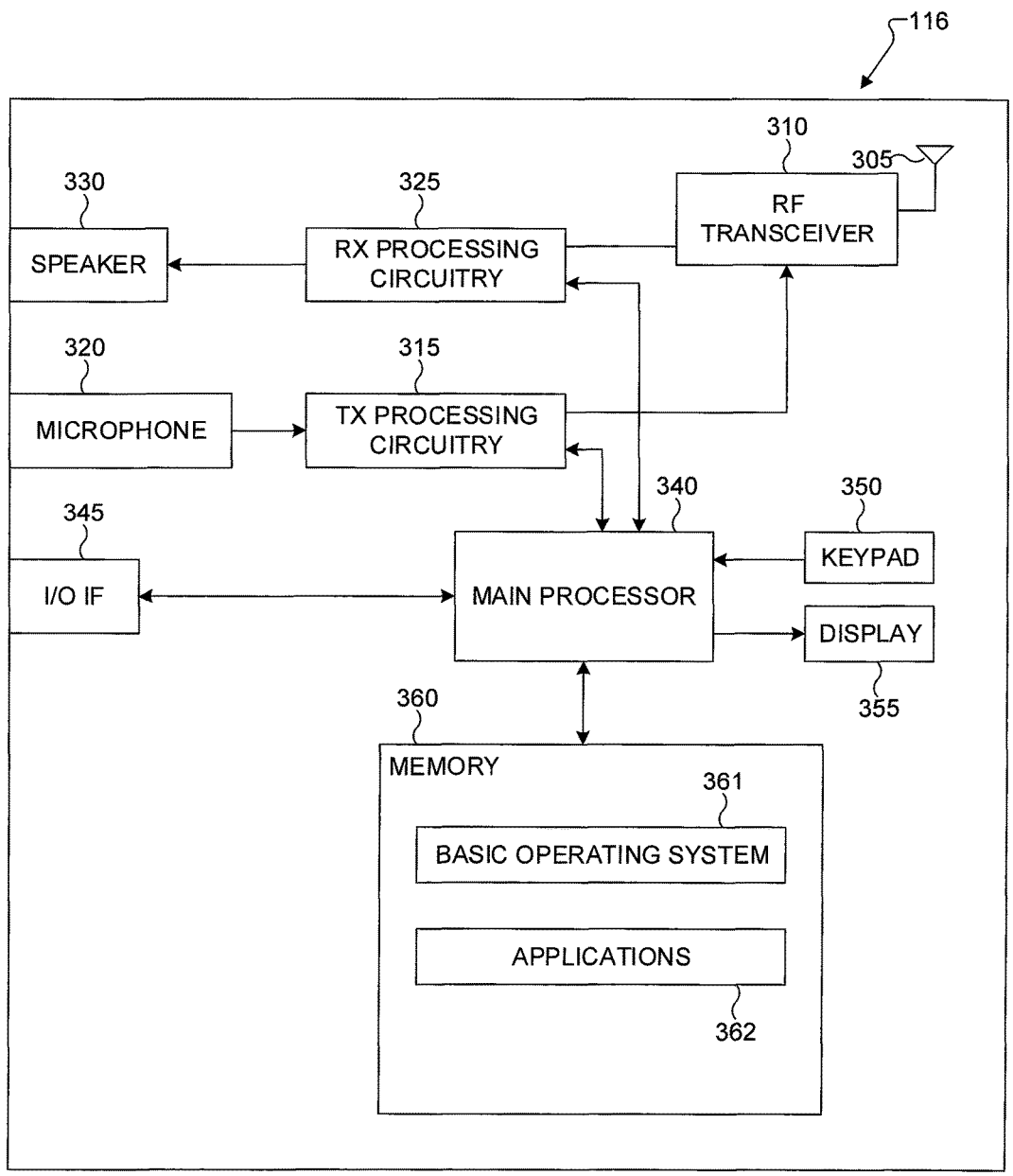

FIGS. 2 and 3 illustrate example electronic devices in a communication system according to various embodiments of the present disclosure. In particular, FIG. 2 illustrates an example computer system 200, and FIG. 3 illustrates an example electronic device 300. In this illustrative example, the computer system 200 represents the server 104 in FIG. 1, and the electronic device 300 could represent one or more of the client devices 110-116 in FIG. 1.

As shown in FIG. 2, the computer system 200 includes a bus system 205, which supports communication between at least one processor 210, at least one storage device 215, at least one communications interface 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor for encoding or decoding of video data.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications interface 220 supports communications with other systems or devices. For example, the communications interface 220 could include a network interface card or a wireless transceiver (e.g., satellite, cellular, WiFi, Bluetooth, NFC, etc.) facilitating communications over the network 120 in FIG. 1. The communications interface 220 may support communications through any suitable physical or wireless communication link(s). The communications interface 220 may include only one or both of a transmitter and receiver, for example, only a receiver may be included in a decoder or only a transmitter may be included in an encoder.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the computer system 200 may be a server of a cloud computing system that collects data and manages the elastic rule engine for smart homes.

FIG. 3 illustrates an example electronic device 300 according to various embodiments of the present disclosure. In this embodiment, the electronic device 300 is an example of one or more of the client devices (e.g., such as client devices 110-116 of FIG. 1). The embodiment of the electronic device 300 illustrated in FIG. 3 is for illustration only, and the client devices 110-116 of FIG. 1 could have the same or similar configuration. However, electronic devices come in a wide variety of configurations, and FIG. 3 does not limit the scope of this disclosure to any particular implementation of an electronic device.

As shown in FIG. 3, the electronic device 300 includes antenna(s) 305, a transceiver 310, transmit (TX) processing circuitry 315, a microphone 320, and receive (RX) processing circuitry 325. The electronic device 300 also includes a speaker 330, a processor 340, an input/output (I/O) interface (IF) 345, a touchscreen 350, a display 355, a memory 360, and one or more sensors 365. The memory 360 includes an operating system (OS) 361 and one or more applications 362.

The transceiver 310 receives, from the antenna(s) 305, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The transceiver 310 receives the outgoing processed baseband or IF signal from the TX processing circuitry 315 and up-converts the baseband or IF signal to an RF signal that is transmitted via the antenna(s) 305. In some embodiments, the transceiver 310, the TX processing circuitry 315, and the RX processing circuitry 325 may be implemented within the same block or chip, such as a WiFi and/or Bluetooth module and/or chip.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from access points, eNBs, or an operator. The processor 340 is also coupled to the I/O interface 345, which provides the electronic device 300 with the ability to connect to other devices, such as laptop computers and handheld computers. The I/O interface 345 is the communication path between these accessories and the processor 340.

The processor 340 is also coupled to the touchscreen 350 and the display 355. The operator of the electronic device 300 can use the touchscreen 350 to enter data and/inputs into the electronic device 300. The display 355 may be a liquid crystal display, light-emitting diode (LED) display, optical LED (OLED), active matrix OLED (AMOLED), or other display capable of rendering text and/or at graphics, such as from web sites, videos, games, etc. The touchscreen 350 can include a touch panel, a (digital) pen sensor, a key, or an ultrasonic input device.

The memory 360 is coupled to the processor 340. Part of the memory 360 could include a random access memory (RAM), and another part of the memory 360 could include a Flash memory or other read-only memory (ROM).

Electronic device 300 further includes one or more sensors 365 that can meter a physical quantity or detect an activation state of the electronic device 300, and convert metered or detected information into an electrical signal. For example, sensor 365 may include one or more buttons for touch input, a camera, a gesture sensor, a gyroscope or gyro sensor, an air pressure sensor, a magnetic field sensor or magnetometer, an acceleration sensor or accelerometer, a grip sensor, a proximity sensor, a color sensor (e.g., a Red Green Blue (RGB) sensor), a temperature/humidity sensor, an illumination sensor, etc. The sensor(s) 365 can further include a control circuit for controlling at least one of the sensors included therein.

Although FIG. 3 illustrates one example of an electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In one or more embodiments, the speaker 330, the microphone 320, and or the touchscreen 350 may not be included in the device 300. For example, in some embodiments, the electronic device 300 may be a smartwatch having display/user interface functionality comparable with that of a smartphone or may be a simple activity tracker with wireless communication functionality but limited or no display/user interface functionality.

Figure 4:
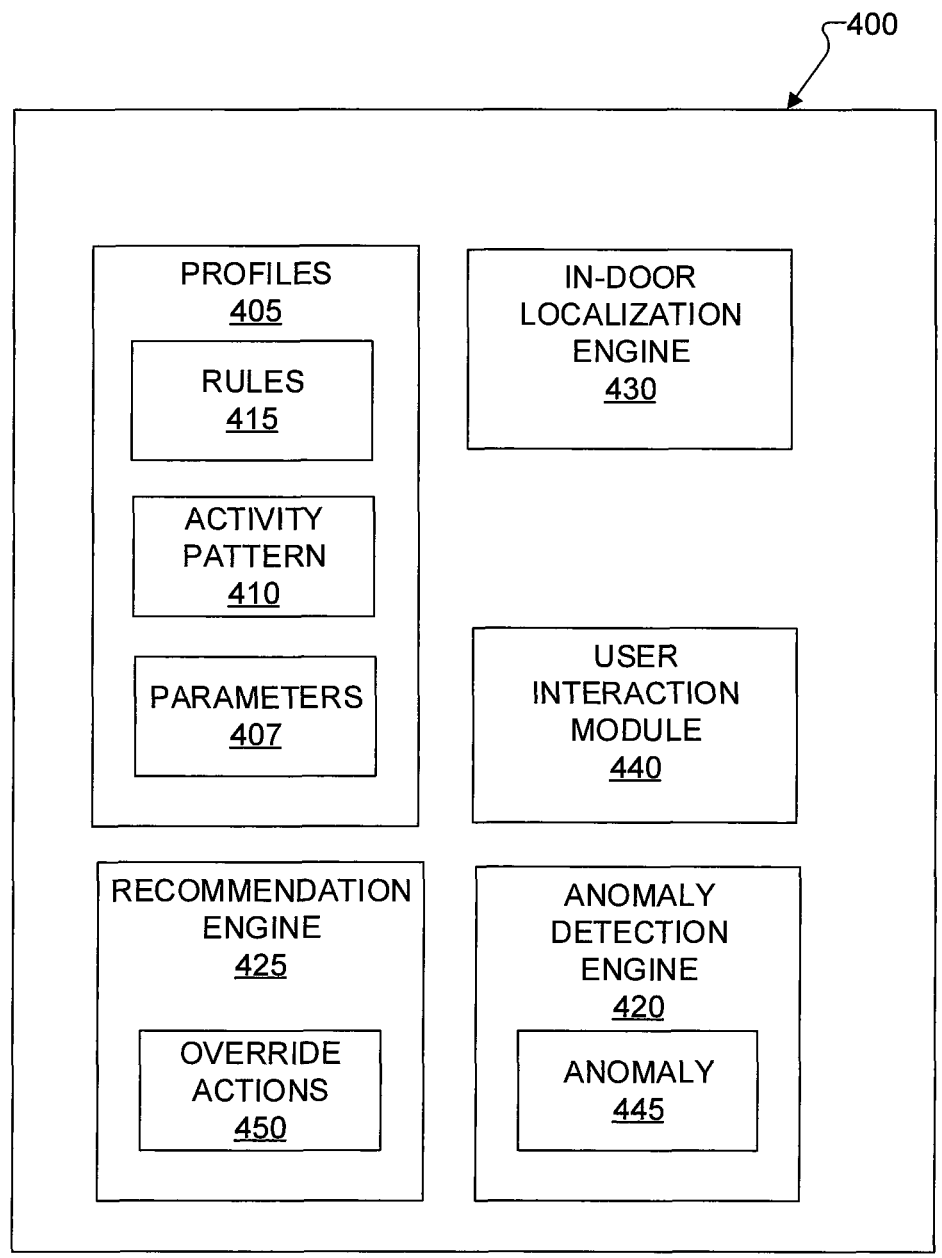
FIG. 4 illustrates an example recommendation system according to various embodiments of the present disclosure.

FIG. 4 illustrates an example recommendation system 400 according to various embodiments of the present disclosure. In this embodiment, the recommendation system 400 can be an example an open cloud server, such as server 104 as shown in FIG. 1. The embodiment of the recommendation system 400 illustrated in FIG. 4 is for illustration only, and the open cloud server could have the same or similar configuration. However, servers come in a wide variety of configurations, and FIG. 4 does not limit the scope of this disclosure to any particular implementation of a server.

In FIG. 4, recommendation system 400 collects data from a number of smart homes through a network, such as network 130 as shown in FIG. 1. The data comes from various sensors at home, such as ambient noise sensor, motion sensor, door/window sensors, thermostat, ambient light sensor, dust sensor, humidity sensor, light switches, appliance status, etc. Each of these sensors can be an example of devices 110-116 as shown in FIG. 1. The data includes profiles 405 of each home, which include different parameters 407, activity patterns 410, and rules 415. The parameters can include a size of home, location of home, age and number of family members, and the like. The activity patterns 410 can include a noise pattern, motion pattern, infrared pattern, and the like. The activity patterns 410 can also be average patterns (i.e., usual patterns) or exceed the average pattern by a threshold amount (i.e., signifying unusual activity, or anomaly). The rules 415 can be triggers to activate or deactivate different client devices and/or sensors.

In one example embodiment, the recommendation system 400 includes anomaly detection engine 420, recommendation engine 425, in-door localization engine 430, and user interaction module 440. The anomaly detection engine 420 is able to detect anomalies 445. The recommendation engine 425 is configured to recommend override actions 450 based on activity patterns 410 and anomalies 445. The in-door localization engine 430 is configured to locate a relevant user to take an override action in specific locations inside a smart home, such as the light in living room. The user interaction module 440 is configured to manage the rules 415, the override actions 450 and interaction with the user.

In one example embodiment, the anomaly detection engine can be configured to detect an anomaly 445 in a home compared to a regular or average activity pattern. For example, an anomaly 445 may be detected when a home party is going on at night the ambient noise sensors capture unusual noise patterns when compared with regular nights. The noise patterns may include amplitude or spectrum features. The anomaly 445 can also be detected from multiple sensors of different types. In this example, the motion sensors could detect unusual activity patterns when compared with regular nights because of the guests moving around. For example, the anomaly detection engine 420 may create a threshold activity pattern based on the regular activity pattern. When an activity level for a particular night exceeds this threshold (which may be set at or above the average or median), the anomaly detection engine 420 detects the anomaly 445. The activity pattern could be a noise pattern, motion pattern, infrared pattern, and the like.

In one example embodiment, the recommendation engine 425 is configured to identify override actions 450 according to a home context. The override actions 450 can be learned through a machine learning process from recorded manual override actions and context. For example, in one or more of all the smart homes, the user may manually override similar rules in similar scenarios. The recommendation engine 425 records the manual override actions and the associated unusual contexts such as the unusual ambient noise and motion patterns. With enough such occurrences, a machine learning system can be trained to recommend the most likely override action when similar context and anomaly is detected in the future. For example, when a light switch scheduler is overridden during high ambient noise and motion activity detected in living room, i.e. an anomaly, a light that would normally turn off may stay on because of the override action automatically selected by the recommendation engine 425 to respond the anomaly.

In one or more embodiments, the recommendation system 400 can first define similarity between smart homes in terms of the parameters 407, such as footage, location, energy usage, family size, people's ages, professions, education level, and the like. In this way, no privacy is compromised. The recommendation system 400 can then define the similarity between rules and context in terms of target device and action, rule triggers (time, or dependencies), context type and data (sensors), and the like. For example, a first rule (turning off the light at 9 pm) can be more similar with a second rule (turning off the light at 10 pm), but less similar with a third rule (turning on the light at 8 am). Thus, the override action learned from similar rules, such as the first rule, in similar smart homes can be recommended for the second rule in this home in similar context. The recommendation system 400 enables the user of smart home to have the most desirable recommended override action in the unplanned scenario, even if the most desirable recommendation is the first occurrence in that home.

In one example embodiment, the in-door localization engine 430 is configured to find the nearest family member to take the override action with respect to a rule. In various example embodiments, the smart home can be controlled from each family member's personal mobile device, such as smart watch or smartphone. The in-door localization technology can accurately target the most relevant family member, who either has the control access of the smart home system, or is the person at the right in-door location to take the override action.

In one example embodiment, the user interaction module 440 is configured to manage the rules and interaction with a user. Once the override action is recommended to the right person through a mobile application, the final action and context will be recorded for future machine learning purpose.

Figure 5:
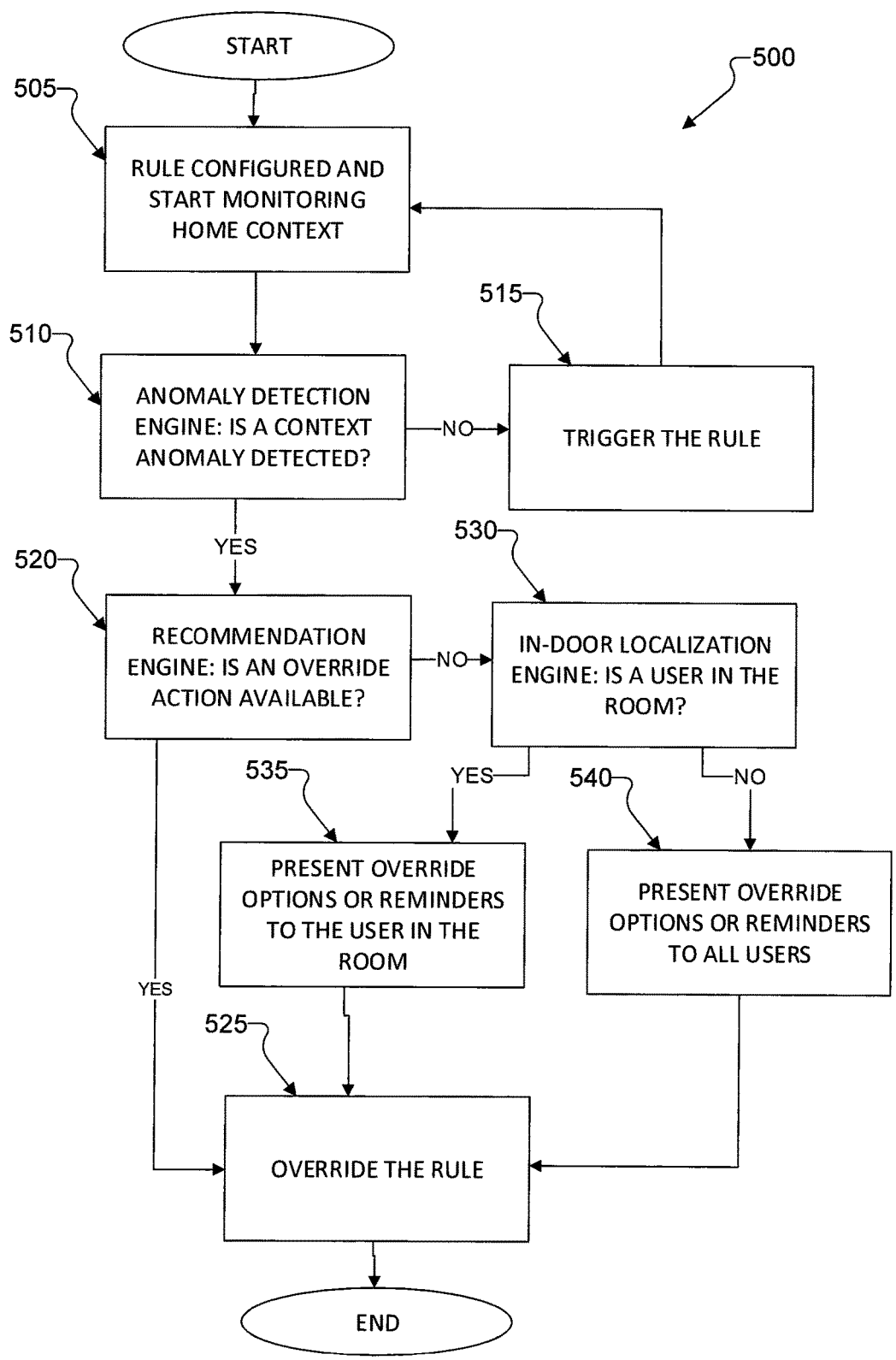
FIG. 5 illustrates a process for managing a rule in a smart home system in accordance with various embodiments of the present disclosure.

FIG. 5 illustrates a process 500 for managing a rule in a smart home system in accordance with various embodiments of the present disclosure. For example, the process 500 depicted in FIG. 5 may be performed by the server 104 in FIG. 1. The embodiment of the process 500 shown in FIG. 5 is for illustration only. Other embodiments of the process 500 could be used without departing from the scope of this disclosure.

The process begins with the system monitoring a rule (step 505). For example, in step 505, the system may monitor a home context for the conditions of a rule. When the conditions are met, the system then determines whether an anomaly is detected (step 510). For example, in step 510, the system may compare activity patterns to average or past activity patterns to determine whether unusual activity is present in the smart home system. If there is no anomaly detected, then the system triggers the rule (step 515). When a rule is triggered, the system may manage one or more client devices based on the rule, such as turning on/off a light, changing a temperature, and the like.

When the anomaly is detected, the system determines whether an override action is available (step 520) to best handle this anomaly. For example, in step 520, the override action is available if there are override actions in similar contexts occurring in other smart home systems, or if the user of this smart home system has used an override action in a similar context. If there is a most likely override action available, the system then overrides the rule (step 525) automatically. If there is no override action available or multiple override options with approximately same likelihood, the system determines whether there is a user in a room (step 530). The room may be a room where a client device controlled by the rule is located. The user may be a registered user with the system. If there is a user in the room, the system presents the override options or reminders to the user (step 535). If there is no user in the room, the system presents the override options or reminders to all users of the smart home system (step 540). If a user selects one of the override options or makes a new override action, the system overrides the rule (step 525). The entire process 500 will be recorded by server 104 and may be used as new training data to either reinforce or enhance the learning process of recommendation engine 425.

Although FIG. 5 illustrates an example process for managing a smart home, various changes could be made to FIG. 5. For example, while shown as a series of steps, various steps in each figure could overlap, occur in parallel, occur in a different order, or occur multiple times.

Embodiments of the present disclosure provide an elastic rule engine for smart homes. By collecting a number of smart homes' rules and override actions with anomaly contexts, a machine learning system will learn from those crowd-sourced data and recommend the most likely override action when similar anomaly is detected in the future. For situations where the elastic rule engine cannot make a clear recommendation or doesn't have a learned override action, it will ask the user to take an override action and learn from the user's decision continuously.

Embodiments of the present disclosure address a key problem in smart home systems—how to create and manage rules easily while keeping them elastic when needed to facilitate the relaxing lifestyle at home. By letting the elastic rule engine learn from crowd-sourced data and handle anomalies automatically, this significantly simplifies the rule configuration and management in smart homes.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
   a communications unit configured to communicate with a client device in a system;
   at least one processor coupled to the communications unit, the at least one processor configured to:
      monitor a rule in the system, wherein the rule, when triggered, controls the client device to perform a device action;
      responsive to the rule for the client device being triggered to perform the device action, determine whether an anomaly exists in the system based on a plurality of activity patterns;
      response to the anomaly existing, determine whether an override action is available for the anomaly; and
      responsive to the override action being available, override the rule to prevent the device action.

2. The apparatus of claim 1, wherein the at least one processor is further configured to, responsive to the override action not being available, present override options or reminders to at least one user.

3. The apparatus of claim 1, wherein the at least one processor is configured to:
   identify another rule at another system similar to the rule of the system;
   identify another override action taken when the other rule is triggered during another anomaly in the other system; and
   set the other override action available as the override action.

4. The apparatus of claim 1, wherein the at least one processor is configured to:
   determine whether a user previously executed a previous override action for the anomaly; and
   set the previous override action available as the override action.

5. The apparatus of claim 2, wherein the at least one processor is configured to:
   determine whether a user of the at least one user is in a room where the client device is located; and
   responsive to the user being in the room, present the override options or reminders to the user in the room.

6. The apparatus of claim 2, wherein the at least one processor is configured to:
   determine whether any user of the at least one user is in a room where the client device is located; and
   responsive to no user being in the room, present the override options or reminders to all of the at least one user.

7. The apparatus of claim 1, wherein the at least one processor is configured to:
   compare a current activity pattern to an average activity pattern of the plurality of activity patterns; and
   responsive to the current activity pattern deviating from the average activity pattern by a threshold amount, identify the anomaly.

8. The apparatus of claim 7, wherein one or more client devices of the system indicates the current activity pattern.

9. The apparatus of claim 7, wherein the current activity pattern includes one or more of a noise pattern, motion pattern, or infrared pattern.

10. The apparatus of claim 7, wherein the current activity pattern includes one or more of a size of a home, location of the home, or age and number of family members of the home.

11. A method for managing a rule in a smart home system, the method comprising:
- monitoring the rule in the smart home system, wherein the rule, when triggered, controls a client device to perform a device action in the smart home system;
- responsive to the rule for the client device being triggered to perform the device action, determining whether an anomaly exists in the smart home system based on a plurality of activity patterns;
- response to the anomaly existing, determining whether an override action is available for the anomaly; and
- responsive to the override action being available, overriding the rule to prevent the device action.

12. The method of claim 11, further comprising:
- responsive to the override action not being available, presenting override options or reminders to at least one user.

13. The method of claim 11, wherein determining whether the override action is available for the anomaly comprises:
- identifying another rule at another smart home system similar to the rule of the smart home system;
- identifying another override action taken when the other rule is triggered during another anomaly in the other smart home system; and
- setting the other override action available as the override action.

14. The method of claim 11, wherein determining whether the override action is available for the anomaly comprises:
- determining whether a user previously executed a previous override action for the anomaly; and
- setting the previous override action available as the override action.

15. The method of claim 12, wherein presenting the override options or reminders to the at least one user comprises:
- determining whether a user of the at least one user is in a room where the client device is located; and
- responsive to the user being in the room, presenting the override options or reminders to the user in the room.

16. The method of claim 12, wherein presenting the override options or reminders to the at least one user comprises:
- determining whether any user of the at least one user is in a room where the client device is located; and
- responsive to no user being in the room, presenting the override options or reminders to all of the at least one user.

17. The method of claim 11, wherein determining whether the anomaly exists in the smart home system comprises:
- comparing a current activity pattern to an average activity pattern; and
- responsive to the current activity pattern deviating from the average activity pattern by a threshold amount, identifying the anomaly.

18. The method of claim 17, wherein one or more client devices of the smart home system indicates the current activity pattern.

19. The method of claim 17, wherein the current activity pattern includes one or more of a noise pattern, motion pattern, or infrared pattern.

20. The method of claim 17, wherein the current activity pattern includes one or more of a size of a home, location of the home, or age and number of family members of the home.

* * * * *